S. PEACOCK.
PROCESS OF PRODUCING CALCIUM CARBONITRID.
APPLICATION FILED SEPT. 19, 1912.
1,129,511.
Patented Feb. 23, 1915.
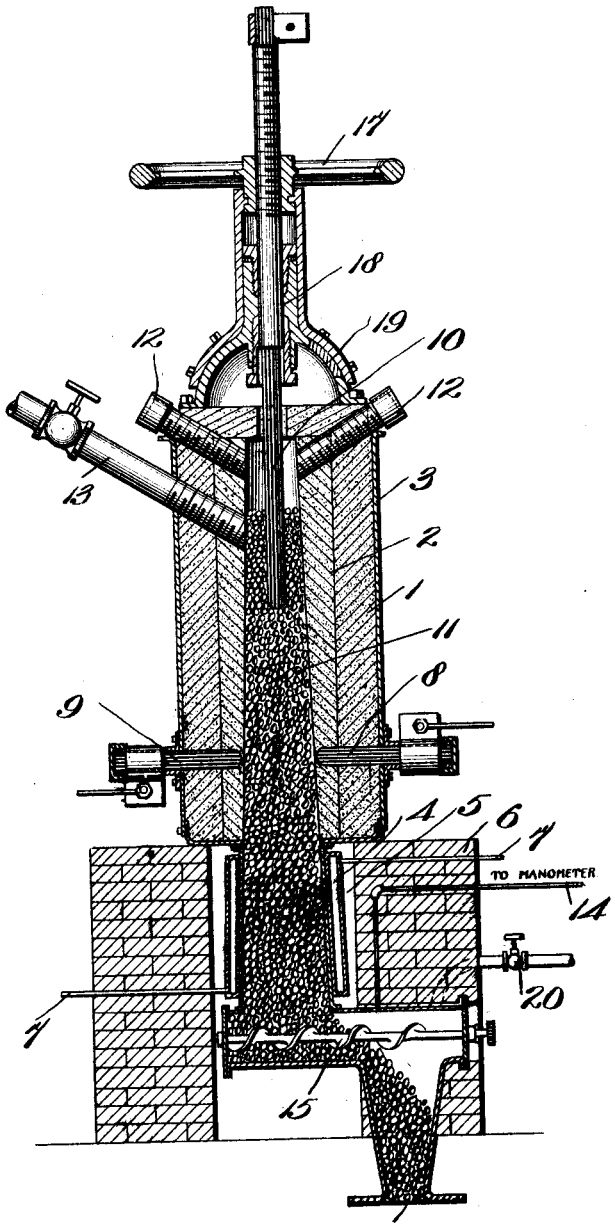
Inventor
Samuel Peacock,
by Wilkinson, Witherspoon
& Mackaye
Attorneys.
Witnesses

UNITED STATES PATENT OFFICE.

SAMUEL PEACOCK, OF CHICAGO, ILLINOIS, ASSIGNOR TO INTERNATIONAL AGRICULTURAL CORPORATION, OF NEW YORK, N. Y., A CORPORATION OF NEW YORK.

PROCESS OF PRODUCING CALCIUM CARBONITRID.

1,129,511. Specification of Letters Patent. Patented Feb. 23, 1915.

Application filed September 19, 1912. Serial No. 721,301.

*To all whom it may concern:*

Be it known that I, SAMUEL PEACOCK, a citizen of the United States, residing at Chicago, in the county of Cook and State of Illinois, have invented certain new and useful Improvements in Processes of Producing Calcium Carbonitrid; and I do hereby declare the following to be a full, clear, and exact description of the invention, such as will enable others skilled in the art to which it appertains to make and use the same.

This invention relates to a process of producing calcium carbo-nitrids from calcium oxid CaO and gaseous nitrogen, and has for its object the fixation of atmospheric nitrogen in a manner less expensive than the methods heretofore proposed.

With this and other objects in view the invention consists in the novel steps constituting my process more fully hereinafter disclosed and particularly pointed out in the claims.

Referring to the accompanying drawings forming a part of this specification in which the figure is a diagrammatic view of a furnace suitable for carrying out my process, 1 indicates any suitable furnace walls but preferably of refractory material having a carborundum lining 2, and a metal casing 3. 4 indicates a water jacket surrounding a lower extension of the casing 3, and located within the chamber 5 of the base brick work 6.

7 represents inlet and exit pipes for the water supplied to the water jacket; 8, 9 and 10 represent electrodes for passing a suitable current through the charge 11; 12 suitable gas tight pipes for feeding the charge to the furnace; 13 an inlet pipe for the gaseous nitrogen or producer gas that is fed to the furnace; and 14 a suitable connection with a manometer for indicating the pressure of gas inside the furnace.

15 indicates a suitable means for discharging the finished product through the exit 16, closed by any suitable means not shown.

17 represents a hand wheel for adjusting one of the electrodes, 18 a stuffing box, 19 an orifice for facilitating access to the top of the furnace, and 20 a pipe for drawing off the furnace gases.

In carrying out my process I prepare a charge of finely divided calcium oxid and carbon suitably proportioned, preferably briquet the same, and introduce the briquets through the feed pipes 12. Unless the charge is briqueted considerable difficulty is liable to be experienced in maintaining an efficient atmosphere of nitrogen in all parts of the furnace. And since the carbo-nitrid is formed at the instant the calcium oxid is reduced, unless a sufficient supply of nitrogen is present, a lower carbid may form, which will not dissociate to form the carbo-nitrid, all as will presently appear. Gaseous nitrogen, or preferably producer gas is introduced through the pipe 13, current is turned on and the temperature is raised to substantially 2000° C., whereupon the following reaction takes place:—

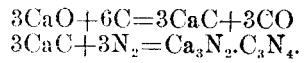

Should an insufficient proportion of nitrogen be present, instead of the carbid CaC being converted into the carbo-nitrid form, it may dissociate to a lower carbid such as $Ca_2C$ which does not fix nitrogen as a carbonitrid. Further by briqueting the charge not only is a uniform distribution of nitrogen assured, but there is secured a uniform flow of gas, which avoids channeling; further, briqueting also tends to prevent or lessen the volatilization of the compounds formed. After the carbo-nitrid is formed in the high temperature zone between the electrodes, it passes down by gravity out of said zone to the lower part of the furnace, where it is gradually cooled by the water jacket 4 in an atmosphere of nitrogen, or producer gas, as the case may be. From this latter position it is continuously removed from the furnace by the conveyer 15, and since the material is constantly fed in at the top, the process is a continuous one. Of course, any other suitable type of furnace than the one illustrated may be employed.

Either nitrogen gas or producer gas may be employed as above stated, but I prefer producer gas on account of its cheapness. Such gas contains on the average about 60% nitrogen, $N_2$, and 40% carbon monoxid, CO, and when the nitrogen is removed by my process the producer gas is greatly improved and enriched and can also be utilized for combustion or other purposes. That is to say, from the carbo-nitrid equation, above, it is evident that for each volume of nitrogen fixed, an equal volume of carbon monoxid, CO, is liberated, and joins the furnace gases.

Now when the producer gas is employed, having say 60% of nitrogen and 40% of carbon monoxid, and if one-third or 20% of the nitrogen is fixed, it is evident that 20% of carbon monoxid will still be added to the 40% of carbon monoxid already present. Accordingly the resulting mixture will contain 60% of carbon monoxid instead of its original 40%. It follows, therefore, that the producer gas by my process is not only purified of its nitrogen but it is also enriched by a substantial addition of carbon monoxid, causing it to become a valuable by-product.

In carrying out the process in order to avoid a serious retardation of the reaction it is desirable to maintain such a flow of nitrogen through the furnace that the partial pressure of the carbon monoxid gas present will not exceed say 480 to 500 millimeters of mercury. This can be accomplished after determining from time to time the percentage of carbon monoxid present, and taking note of the gaseous pressure in the furnace. The calcium carbo-nitrid thus produced may be used for a variety of purposes, but I prefer to treat it with superheated steam at substantially 200° C., when the following reaction takes place:—

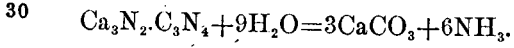

$$Ca_3N_2 \cdot C_3N_4 + 9H_2O = 3CaCO_3 + 6NH_3.$$

Ammonia will be produced by treating the carbo-nitrid with water at less temperatures, but the reaction velocity in such cases will be reduced as the temperature lowers.

The carbon-monoxid or other furnace gas may be drawn from the furnace by any suitable means, as for example through the pipe 20.

It is obvious that those skilled in the art may vary the details of my process without departing from the spirit of my invention, and therefore I do not wish to be limited to the above disclosure except as may be required by the claims.

What I claim is:—

1. The process of producing calcium carbo-nitrid, which consists in preparing a mixture of calcium oxid and carbon; forming the same into briquets; and subjecting the briquets in an atmosphere containing free nitrogen to a temperature sufficient to produce said carbo-nitrid, substantially as described.

2. The process of producing calcium carbo-nitrid, which consists in preparing a mixture of calcium oxid and carbon; subjecting the same in an atmosphere containing nitrogen but substantially devoid of free oxygen to a temperature sufficient to produce said carbo-nitrid; and cooling said carbo-nitrid in an inert atmosphere; substantially as described.

3. The process of producing calcium carbo-nitrid, which consists in preparing a mixture of calcium oxid and carbon; and subjecting the same in an atmosphere of producer gas to a temperature sufficient to produce said carbo-nitrid; substantially as described.

4. The process of producing calcium carbo-nitrid, which consists in preparing a mixture of calcium oxid and carbon; subjecting the same in an atmosphere of producer gas to a temperature sufficient to produce said carbo-nitrid; and gradually cooling said carbo-nitrid in an atmosphere inert to said carbo-nitrid; substantially as described.

5. The process of producing calcium carbo-nitrid, which consists in preparing a mixture of calcium oxid and carbon; and subjecting the same in an atmosphere containing free nitrogen to a temperature sufficient to produce said carbo-nitrid thereby causing carbon-monoxid to be evolved while maintaining the partial pressure of the carbon-monoxid present below 500 millimeters of mercury, substantially as described.

In testimony whereof, I affix my signature, in presence of two witnesses.

SAMUEL PEACOCK.

Witnesses:
WM. SAMUEL CEIGHOF,
LEONARD S. GROVE.